United States Patent [19]

Niimi et al.

[11] 4,225,311
[45] Sep. 30, 1980

[54] DYE COMPOSITION CONTAINING A COPOLYMER OF ETHYLENE OXIDE AND PROPYLENE OXIDE AS NONIONIC SURFACTANT

[75] Inventors: Yukihisa Niimi, Osaka; Junko Kakuse; Toshio Sato, both of Wakayama; Hideo Kawanaka, Osaka, all of Japan

[73] Assignee: Kao Soap Co., Ltd., Tokyo, Japan

[21] Appl. No.: 861,302

[22] Filed: Dec. 16, 1977

[30] Foreign Application Priority Data

Dec. 27, 1976 [JP] Japan .................. 51-158038

[51] Int. Cl.$^3$ .......................... D06P 1/22; D06P 1/52; D06P 1/613
[52] U.S. Cl. .......................... 8/524; 8/583; 8/589; 8/590; 8/552
[58] Field of Search .................... 8/93, 173, 174, 89 R, 8/79, 34

[56] References Cited

U.S. PATENT DOCUMENTS

| 2,760,841 | 9/1956 | Salvin et al. | 8/93 |
|---|---|---|---|
| 2,930,792 | 3/1960 | Fleysher | 8/70 |
| 3,377,130 | 4/1968 | Millson et al. | 8/54 |
| 3,706,525 | 12/1972 | Blackwell et al. | 8/93 |
| 3,802,905 | 4/1974 | Beyer et al. | 8/93 |
| 3,951,598 | 4/1976 | Arashi et al. | 8/174 |
| 3,957,425 | 5/1976 | Tullio | 8/93 |
| 3,963,432 | 6/1976 | Hauxwell et al. | 8/93 |
| 4,063,880 | 12/1977 | Tullio | 8/93 |

FOREIGN PATENT DOCUMENTS

| 599015 | 5/1960 | Canada | 8/79 |
|---|---|---|---|
| 2348518 | 4/1975 | Fed. Rep. of Germany | 8/79 |
| 44-22744 | 9/1969 | Japan | 8/173 |
| 1339680 | 12/1973 | United Kingdom | 8/93 |
| 1368322 | 9/1974 | United Kingdom | 8/79 |
| 292698 | 1/1971 | U.S.S.R. | 8/79 |

OTHER PUBLICATIONS

Fortess, F. Advances In Textile Processing vol. 1, 1967 pp. 340-342.

Primary Examiner—Joseph L. Schofer
Assistant Examiner—Maria S. Tungol
Attorney, Agent, or Firm—Blanchard, Flynn, Thiel, Boutell & Tanis

[57] ABSTRACT

A dye composition contains as indispensable ingredients a water-insoluble dye and 10-150% by weight, based on the dye, of a nonionic surfactant of the general formula:

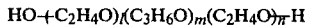

$$HO(C_2H_4O)_l(C_3H_6O)_m(C_2H_4O)_nH$$

wherein l, m and n each represent an integer of one or more l+m+n being in the range of 100-350 and (l+n)/m being two or more.

8 Claims, No Drawings

DYE COMPOSITION CONTAINING A COPOLYMER OF ETHYLENE OXIDE AND PROPYLENE OXIDE AS NONIONIC SURFACTANT

BACKGROUND OF THE INVENTION

1. Field of the Invention

The present invention relates to a high concentration dye composition in which a water-insoluble dye is contained in the form of fine particles stably dispersed therein.

2. Description of Prior Arts

When a water-insoluble dye is to be used for dyeing or printing, generally a dye composition, previously prepared in the form of stably dispersed fine particles in a separate step, is added to a dyeing bath or printing paste. Ordinary water-insoluble dye compositions contain a dispersant as an indispensable ingredient for finely dividing the dye per se and also for stabilizing the dispersion. As the dispersant, there have been used formalin condensates of aromatic sulfonates such as $\beta$-naphthalenesulfonate and anionic surfactants such as sodium lignin sulfonate and sodium alkylbenzene sulfonates in an amount of 50–200% by weight based on the dye. However, the dyes containing those dispersants cannot be stored stably for a long period of time.

SUMMARY OF THE INVENTION

After intensive investigations for the purpose of overcoming the defects of the known dispersants, the inventors have succeeded in the production of a highly concentrated dye composition which can be divided finely and dispersion-stabilized by a treatment by a mechanical force within a short period of time and which can be stored stably for a long period of time by using 10–150% by weight, based on the weight of the dye, of a nonionic surfactant comprising a block copolymer of general formula (1):

$$HO{+}(C_2H_4O)_l(C_3H_6O)_m(C_2H_4O)_n H \quad (1)$$

wherein l, m and n each represent an integer of one or more, l+m+n being in the range of 100–350 and (l+n)/m being two or more.

The inventors have further succeeded in obtaining a dye composition containing more finely divided particles having a higher dispersion-stability by using the combination of said nonionic surfactant of general formula (1) and a formalin condensate of an aromatic sulfonate in a weight ratio of 2:8–8:2 as compared with those wherein the surfactant or the condensate is used alone.

The water-insoluble dyes according to the present invention include disperse dyes, vat dyes and oil-soluble dyes.

The finely divided dye composition according to the present invention can be produced by finely dividing 10–50 parts by weight of a water-insoluble dye and 10–150% by weight, based on the weight of the dye, of a dispersant of the present invention, such as defined above, together with 89–30 parts by weight of water in a pulverizing device that works continuously or discontinuously until the average particle diameter of the dye is reduced to 0.1–1$\mu$.

The nonionic surfactant used in the present invention is a block copolymer obtained by adding ethylene oxide to polypropylene glycol in the presence of an alkali catalyst acording to a known process.

The nonionic surfactant according to the present invention is thus a block copolymer having a higher dispersion-stabilizing power than that of a random polymer. If the molar ratio of propylene oxide to ethylene oxide in the adduct is 1 to less than 2 or if the total mole number of both oxides is less than 100, the dispersion-stabilizing power will be poorer. In other words, if the surface tension of the aqueous dispersant solution is too small or if the molecular weight thereof is too low, the dispersion-stabilizing power will be poorer.

As the formalin condensate of an aromatic sulfonate according to the present invention, there may be mentioned formalin condensates of sodium $\beta$-naphthalenesulfonate, sodium cresolsulfonate, sodium creosote oil sulfonate, sodium phenolsulfonate and sodium lower alkylphenolsulfonate. Among them, there is preferably used the formalin condensate of sodium $\beta$-naphthalene sulfonate and that of sodium cresolsulfonate.

The proportion of the nonionic surfactant to the formalin condensate of an aromatic sulfonate is in the range of 2/8–8/2 (by weight) to exhibit a dispersion-stabilizing power which is far superior to that of a case wherein only one of them is used. Although the cause of the synergistic effect has not been elucidated yet, it is considered to be attributable to a change in both reduction of surface tension by the nonionic surfactant and electric repulsion by the anionic surfactant. The dye composition according to the present invention can be put on the market in the form of powders prepared by spray-drying the aqueous dye dispersion obtained as above. The dispersant according to the present invention thus has effects of preventing the dye from scattering and preventing the powders from coagulation and blocking, whereby the composition can be kept in powdery form for a long period of time.

The following examples further illustrate the present invention concretely, wherein parts are given by weight.

EXAMPLE 1

15 parts of C.I. Disperse Orange 3 of the formula:

were blended together with 5 parts of a nonionic surfactant of the structural formula:

and 80 parts of water. The whole was finely divided in a sand mill until an average particle diameter of less than 1$\mu$ was attained and then taken out from the mill. The high concentration dye composition was stable even after one month. Secondary coagulated particles were hardly recognized by microscopic observation.

EXAMPLE 2

15 parts of the same dye as in Example 1 were blended together with 10 parts of a nonionic surfactant of the structural formula:

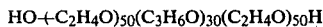

and 75 parts of water. The whole was finely divided in a sand mill until an average particle diameter of less than 1μ was attained and then taken out from the mill. The composition was stable even after one month. Secondary coagulated particles were hardly recognized by microscopic observation.

EXAMPLE 3

15 parts of the same dye as in Example 2 were blended together with 5 parts of the same nonionic surfactant as in Example 2 and 5 parts of formalin condensate of sodium β-naphthalenesulfonate and 75 parts of water. The whole was finely divided in a sand mill until an average particle diameter of less than 1μ was attained and then taken out from the mill. The composition was stable even after one month. Secondary coagulated particles were hardly recognized by microscopic observation. Coagulated particles were smaller in amount than those in Examples 1 and 2.

EXAMPLE 4

15 parts of C.I. Disperse Red 16 of the formula:

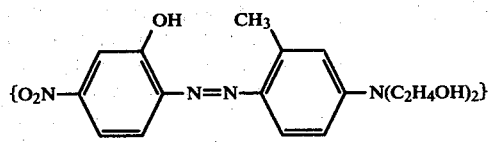

were blended together with 15 parts of a nonionic surfactant of the structural formula:

and 70 parts of water. The whole was finely divided in a sand mill until an average particle diameter of less than 1μ was attained and then taken out from the mill. The high concentration composition was stable even after one month. Secondary coagulated particles were hardly recognized by microscopic observation.

EXAMPLE 5

20 parts of the same dye as in Example 4 were blended together with 25 parts of a nonionic surfactant of the structural formula:

and 55 parts of water. The whole was finely divided in a sand mill until an average particle diameter of less than 1μ was attained and then taken out from the mill. The high concentration composition was stable even after one month. Secondary coagulated particles were hardly recognized by microscopic observation.

EXAMPLE 6

15 parts of the same dye as in Example 4 were blended together with 7 parts of the same nonionic surfactant as in Example 4, 8 parts of formalin condensate of sodium cresolsulfonate and 70 parts of water. The whole was finely divided in a sand mill until an average particle diameter of less than 1μ was attained and then taken out from the mill. The composition was stable even after one month. Secondary coagulated particles were hardly recognized by microscopic observation. Secondary coagulated particles were smaller in amount than those in Example 4.

EXAMPLE 7

25 parts of C.I. Disperse Blue 27 of the formula:

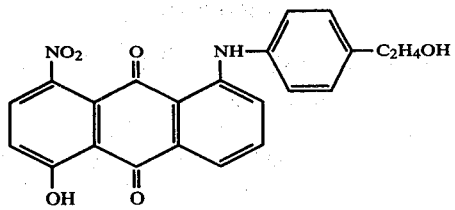

were blended together with 10 parts of a nonionic surfactant of the structural formula:

and 65 parts of water. The whole was finely divided in a sand mill until an average particle diameter of less than 1μ was attained and then taken out from the mill. The composition was stable even after one month. Secondary coagulated particles were hardly recognized by microscopic observation.

Comparative Example 1 (Comparison with Examples 2 and 4)

15 parts of the same dye as in Example 2 were blended together with 10 parts of formalin condensate of sodium β-naphthalenesulfonate and 70 parts of water. The whole was finely divided in a sand mill until an average particle diameter of less than 1μ was attained and then taken out from the mill. The high concentration dye composition had a slightly increased viscosity after one month and plenty of secondary coagulated particles were recognized by microscopic observation.

Comparative Example 2 (Comparison with Example 7)

25 parts of the same dye as in Example 7 were blended together with 10 parts of sodium ligninsulfonate and 65 parts of water. The whole was finely divided in a sand mill until an average particle diameter of less than 1μ was attained and then taken out from the mill. The composition had a slightly increased velocity after one day and plenty of secondary coagulated particles were recognized by microscopic observation.

Comparative Example 3 (Comparison with Examples 4 and 6)

15 parts of the same dye as in Example 4 were blended together with 15 parts of formalin condensate of sodium cresolsulfonate and 70 parts of water. The whole was finely divided in a sand mill until an average particle diameter of less than 1μ was attained and taken out from the mill. The composition had a slightly increased velocity after one month and plenty of secondary coagulated particles were recognized by microscopic observation.

Comparative Example 4

15 parts of the same dye as in Example 7 were blended together with 10 parts of a nonionic surfactant comprising nonylphenol added with 20 moles of ethylene oxide and 75 parts of water. The whole was finely divided in a sand mill until an average particle diameter of less than 1μ was attained and taken out from the mill.

The composition had an increased viscosity after one month and coagulation was apparently recognized.

What is claimed is:

1. A dye composition which is an aqueous dispersion consisting essentially of
   (a) from 10 to 50 parts by weight of water-insoluble dye,
   (b) from 10 to 150% by weight, based on the weight of said dye, of nonionic surfactant having the formula $$HO\text{--}(C_2H_4O)_l(C_3H_6O)_m(C_2H_4O)_n H$$

wherein l, m and n each is an integer of one or more, the sum of l plus m plus n is in the range of from 100 to 350, and ((l+n)/m) is 2 or more, and
   (c) from 89 to 30 parts by weight of water, said composition having been prepared by pulverizing a mixture of (a), (b) and (c) until the average particle diameter of said dye is reduced to a size in the range of 0.1 to 1.0 micron.

2. A dye composition as claimed in claim 1 wherein the nonionic surfactant is $HO\text{--}(C_2H_4O)_{90}(C_3H_6O)_{80}(C_2H_4O)_{90}H$.

3. A dye composition as claimed in claim 1, wherein said water-insoluble dye is selected from the group consisting of disperse dyes, vat dyes and oil-soluble dyes.

4. A dye composition which is an aqueous dispersion consisting essentially of
   (a) from 10 to 50 parts by weight of water-insoluble dye,
   (b) from 10 to 150% by weight, based on the weight of said dye, of a mixture of
      (i) nonionic surfactant having the formula $$HO\text{--}(C_2H_4O)_l(C_3H_6O)_m(C_2H_4O)_n H$$

wherein l, m and n each is an integer of one or more, the sum of l plus m plus n is in the range of from 100 to 350, and ((l+n)/m) is 2 or more, and
      (ii) formalin condensate of an aromatic sulfonate, wherein the weight ratio of (i):(ii) is from 2:8 to 8:2, and
   (c) from 89 to 30 parts by weight of water, said composition having been prepared by pulverizing a mixture of (a), (b) and (c) until the average particle diameter of said dye is reduced to a size in the range of 0.1 to 1.0 micron.

5. A dye composition as claimed in claim 4 wherein said aromatic sulfonate is selected from the group consisting of sodium β-naphthalene sulfonate, sodium cresolsulfonate, sodium creosote oil sulfonate, sodium phenolsulfonate and sodium lower ($C_1$-$C_3$) alkylphenolsulfonate.

6. A dye composition as claimed in claim 4 wherein the formalin condensate of an aromatic sulfonate is selected from the group consisting of formalin condensate of sodium β-naphthalene sulfonate and formalin condensate of sodium cresolsulfonate.

7. A process for preparing a dye composition, which consists essentially of finely dividing 10 to 50 parts by weight of a water-insoluble dye, in the presence of from 10 to 150% by weight, based on the weight of said dye, of a nonionic surfactant having the formula:

$$HO\text{--}(C_2H_4O)_l(C_3H_6O)_m(C_2H_4O)_n H$$

wherein l, m and n each is an integer of one or more, the sum of l plus m plus n is in the range of 100 to 350 and the ratio (l+n)/m is two or more, and 30 to 89 parts by weight of water, until the average particle size of said dye is in the range of 0.1 to 1 micron.

8. A process as claimed in claim 7 wherein there is further added a formalin condensate of an aromatic sulfonate in the dividing step.

* * * * *

UNITED STATES PATENT OFFICE
CERTIFICATE OF CORRECTION

Patent No. 4 225 311　　　　　　　　　Dated September 30, 1980

Inventor(s) Yukihisa Niimi et al

It is certified that error appears in the above-identified patent and that said Letters Patent are hereby corrected as shown below:

Column 5, line 16; change "$((l+n)/m)$" to
--- $(l+n)/m$ ---.

Column 5, line 23; change "$HO\text{-}(\text{-}_2H_4O)_{90}(C_3H_6O)_{80}(C_2\text{-}$ "
to --- $HO\text{-}(\text{-}C_2H_4O)_{90}(C_3H_6O)_{80}(C_2\text{-}$ ---.

Column 6, line 3; change "$((l+n)/m)$" to
--- $(l+n)/m$ ---.

Signed and Sealed this

Third Day of February 1981

[SEAL]

Attest:

RENE D. TEGTMEYER

Attesting Officer　　　Acting Commissioner of Patents and Trademarks